US012749964B2

(12) United States Patent
Zhang et al.

(10) Patent No.: US 12,749,964 B2
(45) Date of Patent: Sep. 29, 2026

(54) SYSTEMS AND METHODS FOR DRIVING BIPOLAR TRANSISTORS RELATED TO POWER CONVERTERS

(71) Applicant: ON-BRIGHT ELECTRONICS (SHANGHAI) CO., LTD., Shanghai (CN)

(72) Inventors: Xiuhong Zhang, Shanghai (CN); Lieyi Fang, Shanghai (CN)

(73) Assignee: ON-BRIGHT ELECTRONICS (SHANGHAI) CO., LTD., Shanghai (CN)

( * ) Notice: Subject to any disclaimer, the term of this patent is extended or adjusted under 35 U.S.C. 154(b) by 285 days.

(21) Appl. No.: 18/196,667

(22) Filed: May 12, 2023

(65) Prior Publication Data

US 2023/0369963 A1 Nov. 16, 2023

(30) Foreign Application Priority Data

May 13, 2022 (CN) ......................... 202210520590.5

(51) Int. Cl.
*H02M 1/088* (2006.01)
*H02M 1/00* (2006.01)

(52) U.S. Cl.
CPC ......... *H02M 1/088* (2013.01); *H02M 1/0087* (2021.05)

(58) Field of Classification Search
CPC ............. H02M 1/0003; H02M 1/0009; H02M 1/0029; H02M 1/0038; H02M 1/08;
(Continued)

(56) References Cited

U.S. PATENT DOCUMENTS 8,693,223 B2 4/2014 Lin
9,166,490 B2 10/2015 Yu et al.
(Continued)

FOREIGN PATENT DOCUMENTS

CN 1287403 A 3/2001
CN 101753075 A 6/2010
(Continued)

OTHER PUBLICATIONS

Taiwan Intellectual Property Office, Office Action issued Jun. 6, 2023, in Application No. 111145067.
(Continued)

*Primary Examiner* — Thienvu V Tran
*Assistant Examiner* — Carlos O Rivera-Perez
(74) *Attorney, Agent, or Firm* — Faegre Drinker Biddle & Reath LLP

(57) ABSTRACT

Controller and method for a power converter. For example, a controller for a power converter includes: a first controller terminal connected to a first base of a first bipolar transistor, the first bipolar transistor further including a first collector and a first emitter; a second controller terminal connected to the first emitter of the first bipolar transistor and a second base of a second bipolar transistor, the second bipolar transistor further including a second collector and a second emitter, the second collector being connected to the first collector; a third controller terminal connected to the second emitter of the second bipolar transistor and a resistor, the resistor being configured to generate a sensing voltage received by the third controller terminal.

6 Claims, 7 Drawing Sheets

(58) Field of Classification Search

CPC ...... H02M 1/088; H02M 1/0087; H02M 3/22; H02M 3/24; H02M 3/28; H02M 3/315; H02M 3/3155; H02M 3/325; H02M 3/335; H02M 3/33507; H02M 3/33515; H02M 3/33523; H02M 3/3353; H02M 3/33538–33553; H02M 7/217

USPC ........... 363/13–21.18, 95–99, 123, 131–134; 323/271–275, 277, 278, 282–287, 351; 327/108–112, 419, 427, 432

See application file for complete search history.

(56) References Cited

U.S. PATENT DOCUMENTS

| | | | | |
|---|---|---|---|---|
| 9,537,396 | B2 * | 1/2017 | Knoedgen | H02M 3/158 |
| 9,843,263 | B2 * | 12/2017 | Zhai | H03K 17/063 |
| 10,090,688 | B2 | 10/2018 | Houston et al. | |
| 11,181,966 | B2 | 11/2021 | Waters et al. | |
| 11,303,218 | B2 | 4/2022 | Chen et al. | |
| 2007/0139095 | A1 | 6/2007 | Fang et al. | |
| 2009/0040796 | A1 | 2/2009 | Lalithambika et al. | |
| 2014/0056036 | A1 | 2/2014 | Pan et al. | |
| 2014/0146575 | A1 | 5/2014 | Tse et al. | |
| 2014/0286057 | A1 | 9/2014 | Ho et al. | |
| 2017/0317577 | A1 | 11/2017 | Zhang et al. | |
| 2018/0177009 | A1 | 6/2018 | Zhang et al. | |
| 2022/0364488 | A1 | 11/2022 | Stoltz | |
| 2023/0299607 | A1 | 9/2023 | Yang et al. | |
| 2023/0299608 | A1 | 9/2023 | Huang et al. | |
| 2023/0299766 | A1 * | 9/2023 | Huang | H03K 17/567 327/575 |
| 2024/0006999 | A1 | 1/2024 | Zhang et al. | |
| 2024/0204554 | A1 | 6/2024 | Wang et al. | |
| 2024/0235223 | A1 | 7/2024 | Zheng et al. | |
| 2024/0235224 | A1 | 7/2024 | Zheng et al. | |
| 2025/0253686 | A1 | 8/2025 | Zheng et al. | |

FOREIGN PATENT DOCUMENTS

| | | | |
|---|---|---|---|
| CN | 101894834 | A | 11/2010 |
| CN | 103475210 | B | 4/2016 |
| CN | 105553887 | A | 5/2016 |
| CN | 106341048 | A | 1/2017 |
| CN | 106385091 | A | 2/2017 |
| CN | 206698127 | U | 12/2017 |
| CN | 207234465 | U | 4/2018 |
| CN | 108880296 | A | 11/2018 |
| CN | 110504250 | A | 11/2019 |
| CN | 110799378 | A | 2/2020 |
| CN | 211791278 | U | 10/2020 |
| CN | 111934403 | A | 11/2020 |
| CN | 112290646 | A | 1/2021 |
| CN | 112366799 | A | 2/2021 |
| CN | 108282089 | B | 4/2021 |
| CN | 112636411 | A | 4/2021 |
| CN | 112825312 | A | 5/2021 |
| CN | 112913106 | A | 6/2021 |
| CN | 110739739 | B | 8/2021 |
| CN | 113315192 | A | 8/2021 |
| CN | 113767651 | A | 12/2021 |
| CN | 114336533 | A | 4/2022 |
| CN | 114938043 | A | 8/2022 |
| CN | 217545855 | U | 10/2022 |
| CN | 115395606 | A | 11/2022 |
| CN | 115498725 | A | 12/2022 |
| CN | 218041230 | U | 12/2022 |
| CN | 218124557 | U | 12/2022 |
| JP | 2004-289891 | A | 10/2004 |
| JP | 5912513 | B2 | 4/2016 |
| JP | 5986839 | B2 | 9/2016 |
| TW | 200803142 | A | 1/2008 |
| TW | 201603444 | A | 1/2016 |
| TW | 201624892 | A | 7/2016 |
| TW | 202040920 | A | 11/2020 |
| TW | M624994 | U | 4/2022 |
| TW | I763527 | B | 5/2022 |
| TW | M629346 | U | 7/2022 |
| TW | 202249381 | A | 12/2022 |
| TW | M640153 | U | 4/2023 |
| WO | 2018/040170 | A1 | 3/2018 |
| WO | 2022/214083 | A1 | 10/2022 |

OTHER PUBLICATIONS

Taiwan Intellectual Property Office, Office Action issued Mar. 3, 2023, in Application No. 111135592.

Taiwan Intellectual Property Office, Office Action issued Nov. 3, 2023, in Application No. 112112686.

Taiwan Intellectual Property Office, Office Action issued Oct. 11, 2023, in Application No. 112112687.

Taiwan Intellectual Property Office, Office Action issued Oct. 11, 2023, in Application No. 112112688.

Taiwan Intellectual Property Office, Office Action issued Sep. 5, 2023, in Application No. 112106152.

China Intellectual Property Office, Office Action issued Jun. 4, 2025, in Application No. 202210737276.2.

China Intellectual Property Office, Office Action issued Jun. 5, 2025, in Application No. 202210520590.5.

United States Patent and Trademark Office, Office Action issued Sep. 25, 2025, in U.S. Appl. No. 18/214,433.

Zhang, "A novel drive circuit of monolithic emitter-switching bipolar transistor (ESBT)," Manufacturing Automation, vol. 37, No. 11, pp. 86-89, Nov. 2015.

China Intellectual Property Office, Office Action issued Dec. 1, 2025, in Application No. 202211630534.3.

China Intellectual Property Office, Office Action issued Dec. 1, 2025, in Application No. 202310012608.5.

China Intellectual Property Office, Office Action issued Dec. 1, 2025, in Application No. 202310012633.3.

China Intellectual Property Office, Office Action issued Nov. 15, 2025, in Application No. 202310012688.4.

He et al., "Novel Current Testing Method Suitable for Switching Voltage Stabilizers," Modern Electronic Technology, Issue 16, pp. 198-201, 2010.

* cited by examiner

SYSTEMS AND METHODS FOR DRIVING BIPOLAR TRANSISTORS RELATED TO POWER CONVERTERS

1. CROSS-REFERENCES TO RELATED APPLICATIONS

This application claims priority to Chinese Patent Application No. 202210520590.5, filed May 13, 2022, incorporated by reference herein for all purposes.

2. BACKGROUND OF THE INVENTION

Certain embodiments of the present invention are directed to circuits. More particularly, some embodiments of the invention provide systems and methods for driving bipolar transistors. Merely by way of example, some embodiments of the invention have been applied to flyback power converters. But it would be recognized that the invention has a much broader range of applicability.

Among conventional power converters with small and/or medium output power levels, flyback power converters have become a popular choice for output power level that is less than 100 watts. Often the flyback power converters include only simple circuits that can accommodate a wide range of input voltages and provide high conversion efficiency. In recent years, for the output power level that is less than 10 watts, bipolar transistors are widely used in the flyback power converters. The bipolar transistors usually possess good switching characteristics at low costs.

With the increasing functions of mobile devices such as cell phones and tablet computers, the capacity of the batteries that supply power to the mobile devices has also increased significantly. Consequently, for these batteries, chargers and/or adapters often need to provide larger output power. As an example, over the years, the output power of the chargers and/or adapters has changed from 5 watts to 65 watts. Even though the output power has increased, the chargers and/or adapters still need to reduce in size and/or becomes more efficient.

Hence it is highly desirable to improve the technique for power converters with bipolar transistors.

3. BRIEF SUMMARY OF THE INVENTION

Certain embodiments of the present invention are directed to circuits. More particularly, some embodiments of the invention provide systems and methods for driving bipolar transistors. Merely by way of example, some embodiments of the invention have been applied to flyback power converters. But it would be recognized that the invention has a much broader range of applicability.

According to certain embodiments, a controller for a power converter includes: a first controller terminal connected to a first base of a first bipolar transistor, the first bipolar transistor further including a first collector and a first emitter; a second controller terminal connected to the first emitter of the first bipolar transistor and a second base of a second bipolar transistor, the second bipolar transistor further including a second collector and a second emitter, the second collector being connected to the first collector; a third controller terminal connected to the second emitter of the second bipolar transistor and a resistor, the resistor being configured to generate a sensing voltage received by the third controller terminal; wherein: if the sensing voltage is smaller than a predetermined threshold, the first controller terminal is configured to output a first current to the first base to generate a second current at the first emitter, the second current flowing to the second base to turn on the second bipolar transistor; and if the sensing voltage reaches the predetermined threshold, the second controller terminal is configured to output a third current to the second base before the second bipolar transistor becomes turned off; wherein the third current is smaller than the second current in magnitude.

According to some embodiments, a controller for a power converter includes: a first current source configured to generate a first current; a first transistor including a first transistor terminal, a second transistor terminal, and a third transistor terminal, the first transistor terminal being connected to the first current source; a second transistor including a fourth transistor terminal, a fifth transistor terminal, and a sixth transistor terminal, the fourth transistor terminal being connected to the third transistor terminal; a second current source configured to generate a second current; a third transistor including a seventh transistor terminal, an eighth transistor terminal, and a ninth transistor terminal, the seventh transistor terminal being connected to the second current source; a fourth transistor including a tenth transistor terminal, an eleventh transistor terminal, and a twelfth transistor terminal, the tenth transistor terminal being connected to the ninth transistor terminal; and a drive voltage generator configured to: output a first drive voltage to the second transistor terminal of the first transistor; output a second drive voltage to the fifth transistor terminal of the second transistor; output a third drive voltage to the eighth transistor terminal of the third transistor; and output a fourth drive voltage to the eleventh transistor terminal of the fourth transistor.

According to certain embodiments, a method for a power converter includes: receiving a sensing voltage from a resistor; if the sensing voltage is smaller than a predetermined threshold, outputting a first current to a first base of a first bipolar transistor to generate a second current at a first emitter of the first bipolar transistor, the first emitter of the first bipolar transistor being connected to a second base of a second bipolar transistor, the second current flowing to the second base to turn on the second bipolar transistor, the first bipolar transistor further including a first collector, the second bipolar transistor further including a second collector and a second emitter, the second collector being connected to the first collector, the second emitter being connected to the resistor; and if the sensing voltage reaches the predetermined threshold, outputting a third current to the second base of the second bipolar transistor before the second bipolar transistor becomes turned off; wherein the third current is smaller than the second current in magnitude.

According to some embodiments, a method for a power converter includes: outputting a first drive voltage to a first transistor including a first transistor terminal, a second transistor terminal, and a third transistor terminal, the first transistor terminal being connected to a first current source configured to generate a first current, the second transistor terminal being configured to receive the first drive voltage; outputting a second drive voltage to a second transistor, the second transistor including a fourth transistor terminal, a fifth transistor terminal, and a sixth transistor terminal, the fourth transistor terminal being connected to the third transistor terminal, the fifth transistor terminal configured to receive the second drive voltage; outputting a third drive voltage to a third transistor, the third transistor including a seventh transistor terminal, an eighth transistor terminal, and a ninth transistor terminal, the seventh transistor terminal being connected to a second current source configured to generate a second current, the eighth transistor terminal being configured to receive the third drive voltage; and outputting a fourth drive voltage to a fourth transistor, the fourth transistor including a tenth transistor terminal, an eleventh transistor terminal, and a twelfth transistor terminal, the tenth transistor terminal being connected to the ninth transistor terminal, the eleventh transistor terminal being configured to receive the fourth drive voltage.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for driving bipolar transistors. Merely by way of example, some embodiments of the invention have been applied to flyback power converters. But it would be recognized that the invention has a much broader range of applicability.

Figure 1:
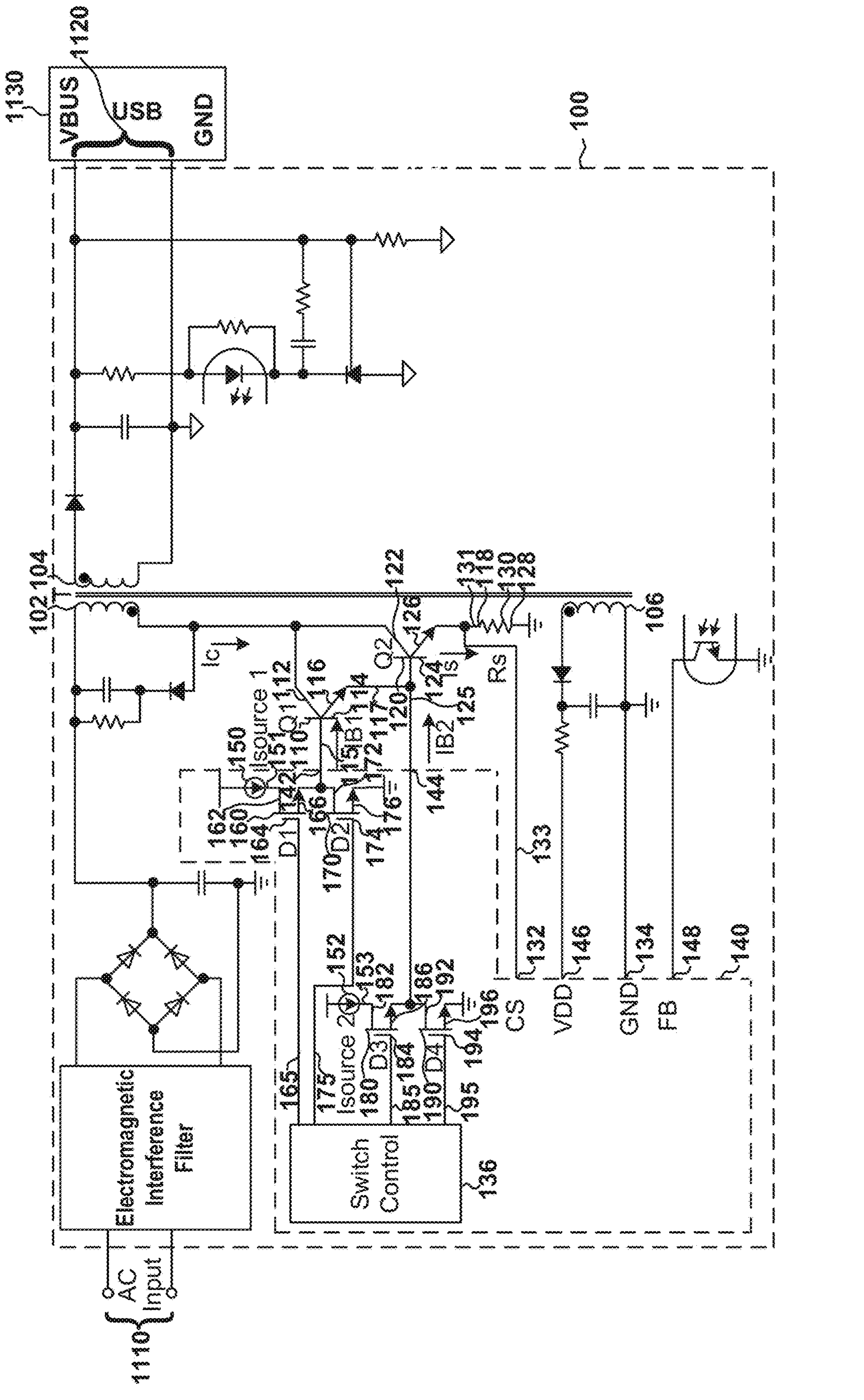
FIG. 1 is a simplified diagram showing a power converter including bipolar transistors according to certain embodiments of the present invention.

FIG. 1 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 100 (e.g., a flyback power converter) includes a primary winding 102, a secondary winding 104, an auxiliary winding 106, bipolar transistors 110 and 120, a resistor 130, and a controller chip 140. For example, the controller chip 140 (e.g., a controller) includes terminals 132, 134, 142, 144, 146, and 148 (e.g., pins). As an example, the controller chip 140 (e.g., a controller) also includes current sources 150 and 152, transistors 160, 170, 180 and 190, and a switch control circuit 136 (e.g., a drive voltage generator). In some examples, each transistor of the transistors 160, 170, 180 and 190 is an N-Channel MOSFET. In certain examples, the primary winding 102, the secondary winding 104, and the auxiliary winding 106 are coupled to each other and are parts of a transformer. In some examples, the power converter 100 receives an AC input voltage 1110 and generates an output voltage 1120. In some examples, the output voltage 1120 is received by a USB connector 1130. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 110 includes a collector 112, a base 114 and an emitter 116, and the bipolar transistor 120 includes a collector 122, a base 124 and an emitter 126. For example, the transistor 160 includes a drain 162, a gate 164, and a source 166. As an example, the transistor 170 includes a drain 172, a gate 174, and a source 176. For example, the transistor 180 includes a drain 182, a gate 184, and a source 186. As an example, the transistor 190 includes a drain 192, a gate 194, and a source 196. In certain examples, the gate 164 of the transistor 160 receives a drive voltage 165 from the switch control circuit 136, the gate 174 of the transistor 170 receives a drive voltage 175 from the switch control circuit 136, the gate 184 of the transistor 180 receives a drive voltage 185 from the switch control circuit 136, and the gate 194 of the transistor 190 receives a drive voltage 195 from the switch control circuit 136. In some examples, the drain 162 of the transistor 160 is connected to the current source 150, and the drain 182 of the transistor 180 is connected to the current source 152. For example, the source 166 of the transistor 160 is connected to the drain 172 of the transistor 170 and the base 114 of the bipolar transistor 110. As an example, the source 186 of the transistor 180 is connected to the drain 192 of the transistor 190 and the base 124 of the bipolar transistor 120. In certain examples, the source 176 of the transistor 170 is biased to a ground voltage, and the source 196 of the transistor 190 is also biased to the ground voltage. In some examples, the resistor 130 includes terminals 118 and 128. For example, the resistor 130 receives a current 131 that flows through the resistor 130 to generate a voltage 133 (e.g., a sensing voltage). As an example, the voltage 133 is received by the terminal 132 of the controller chip 140.

In certain embodiments, the collector 112 of the bipolar transistor 110 is connected to the primary winding 102, and the collector 122 of the bipolar transistor 120 is also connected to the primary winding 102. In some examples, the base 114 of the bipolar transistor 110 is connected to the source 166 of the transistor 160 and the drain 172 of the transistor 170. For example, the base 114 of the bipolar transistor 110 receives a drive current 115. As an example, the emitter 116 of the bipolar transistor 110 is connected to the base 124 of the bipolar transistor 120, the source 186 of the transistor 180, and the drain 192 of the transistor 190. In certain examples, the base 124 of the bipolar transistor 120 is connected to the source 186 of the transistor 180, the drain 192 of the transistor 190, and the emitter 116 of the bipolar transistor 110. For example, the base 124 of the bipolar transistor 120 receives a current 125 from the source 186 of the transistor 180, and the current 125 is equal to a current 153 that is generated by the current source 152. As an example, the base 124 of the bipolar transistor 120 receives a current 117 from the emitter 116 of the bipolar transistor 110. In some examples, the emitter 126 of the bipolar transistor 120 is connected to the terminal 118 of the resistor 130, and the terminal 128 of the resistor 130 is biased to the ground voltage.

As mentioned above and further emphasized here, FIG. 1 is merely an example, which should not unduly limit the scope of the claims. One of ordinary skill in the art would recognize many variations, alternatives, and modifications. For example, the transistor 160 is a P-Channel MOSFET, the transistor 170 is an N-Channel MOSFET, the transistor 180 is a P-Channel MOSFET, and the transistor 190 is an N-Channel MOSFET. As an example, each transistor of the transistors 160, 170, 180 and 190 is a bipolar transistor.

Figure 2:
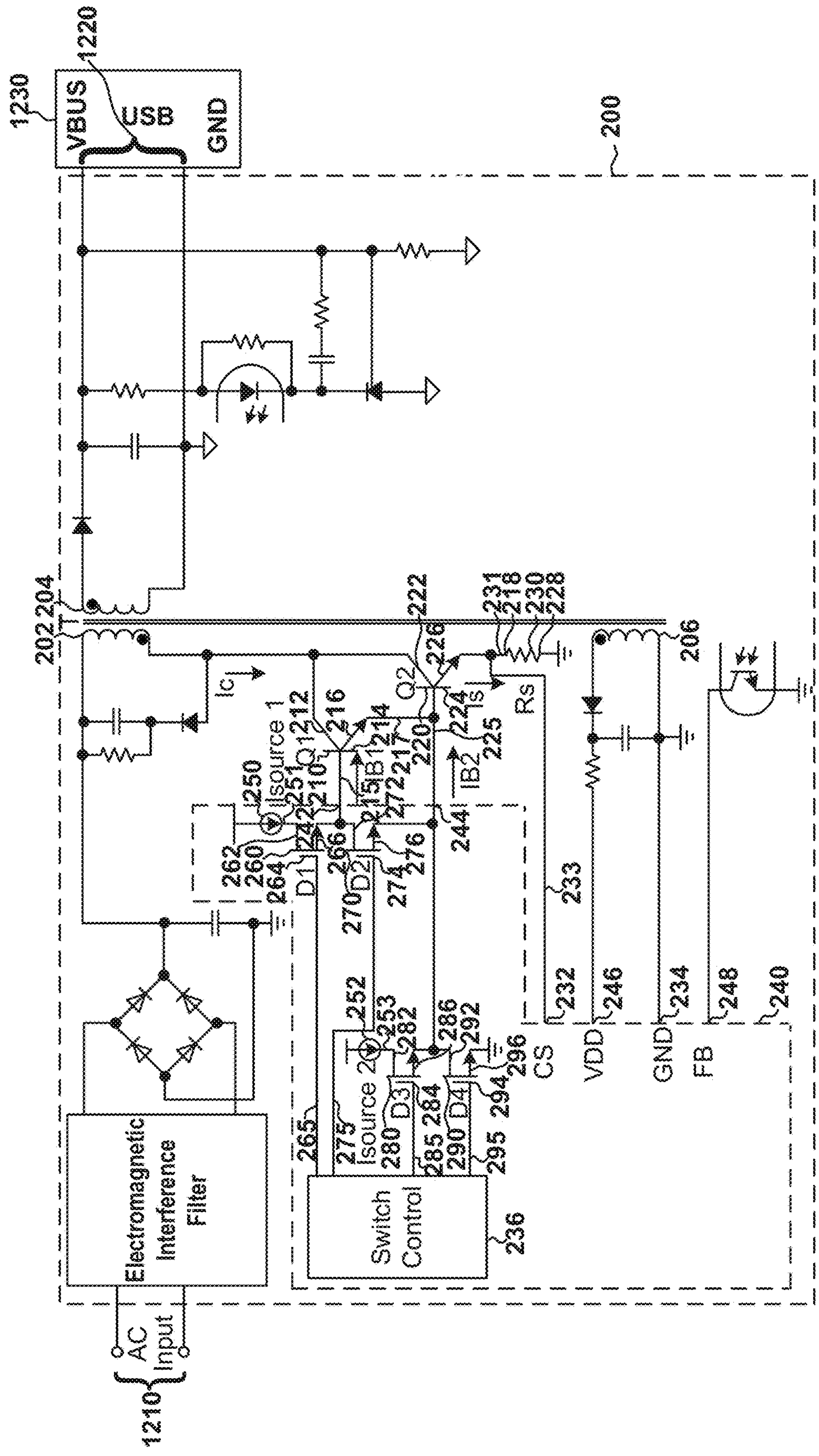
FIG. 2 is a simplified diagram showing a power converter including bipolar transistors according to certain embodiments of the present invention.

FIG. 2 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 200 (e.g., a flyback power converter) includes a primary winding 202, a secondary winding 204, an auxiliary winding 206, bipolar transistors 210 and 220, a resistor 230, and a controller chip 240. For example, the controller chip 240 (e.g., a controller) includes terminals 232, 234, 242, 244, 246, and 248 (e.g., pins). As an example, the controller chip 240 (e.g., a controller) also includes current sources 250 and 252, transistors 260, 270, 280 and 290, and a switch control circuit 236 (e.g., a drive voltage generator). In some examples, the primary winding 202, the secondary winding 204, and the auxiliary winding 206 are coupled to each other and are parts of a transformer. In some examples, each transistor of the transistors 260, 270, 280 and 290 is an N-Channel MOSFET. In certain examples, the power converter 200 receives an AC input voltage 1210 and generates an output voltage 1220. In some examples, the output voltage 1220 is received by a USB connector 1230. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 210 includes a collector 212, a base 214 and an emitter 216, and the bipolar transistor 220 includes a collector 222, a base 224 and an emitter 226. For example, the transistor 260 includes a drain 262, a gate 264, and a source 266. As an example, the transistor 270 includes a drain 272, a gate 274, and a source 276. For example, the transistor 280 includes a drain 282, a gate 284, and a source 286. As an example, the transistor 290 includes a drain 292, a gate 294, and a source 296. In certain examples, the gate 264 of the transistor 260 receives a drive voltage 265 from the switch control circuit 236, the gate 274 of the transistor 270 receives a drive voltage 275 from the switch control circuit 236, the gate 284 of the transistor 280 receives a drive voltage 285 from the switch control circuit 236, and the gate 294 of the transistor 290 receives a drive voltage 295 from the switch control circuit 236. In some examples, the drain 262 of the transistor 260 is connected to the current source 250, and the drain 282 of the transistor 280 is connected to the current source 252. For example, the source 266 of the transistor 260 is connected to the drain 272 of the transistor 270 and the base 214 of the bipolar transistor 210. As an example, the source 286 of the transistor 280 is connected to the drain 292 of the transistor 290 and the base 224 of the bipolar transistor 220. In certain examples, the source 296 of the transistor 290 is biased to a ground voltage, and the source 276 of the transistor 270 is connected to the base 224 of the bipolar transistor 220, the source 286 of the transistor 280 and the drain 292 of the transistor 290. In some examples, the resistor 230 includes terminals 218 and 228. For example, the resistor 230 receives a current 231 that flows through the resistor 230 to generate a voltage 233 (e.g., a sensing voltage). As an example, the voltage 233 is received by the terminal 232 of the controller chip 240.

In certain embodiments, the collector 212 of the bipolar transistor 210 is connected to the primary winding 202, and the collector 222 of the bipolar transistor 220 is also connected to the primary winding 202. In some examples, the base 214 of the bipolar transistor 210 is connected to the source 266 of the transistor 260 and the drain 272 of the transistor 270. For example, the base 214 of the bipolar transistor 210 receives a drive current 215. As an example, the emitter 216 of the bipolar transistor 210 is connected to the base 224 of the bipolar transistor 220, the source 286 of the transistor 280, and the drain 292 of the transistor 290. In certain examples, the base 224 of the bipolar transistor 220 is connected to the source 286 of the transistor 280, the drain 292 of the transistor 290, and the emitter 216 of the bipolar transistor 210. For example, the base 224 of the bipolar transistor 220 receives a current 225 from the source 286 of the transistor 280, and the current 225 is equal to a current 253 that is generated by the current source 252. As an example, the base 224 of the bipolar transistor 220 receives a current 217 from the emitter 216 of the bipolar transistor 210. In some examples, the emitter 226 of the bipolar transistor 220 is connected to the terminal 218 of the resistor 230, and the terminal 228 of the resistor 230 is biased to the ground voltage.

As mentioned above and further emphasized here, FIG. 2 is merely an example, which should not unduly limit the scope of the claims. One of ordinary skill in the art would recognize many variations, alternatives, and modifications. For example, the transistor 260 is a P-Channel MOSFET, the transistor 270 is an N-Channel MOSFET, the transistor 280 is a P-Channel MOSFET, and the transistor 290 is an N-Channel MOSFET. As an example, each transistor of the transistors 260, 270, 280 and 290 is a bipolar transistor.

Figure 3:
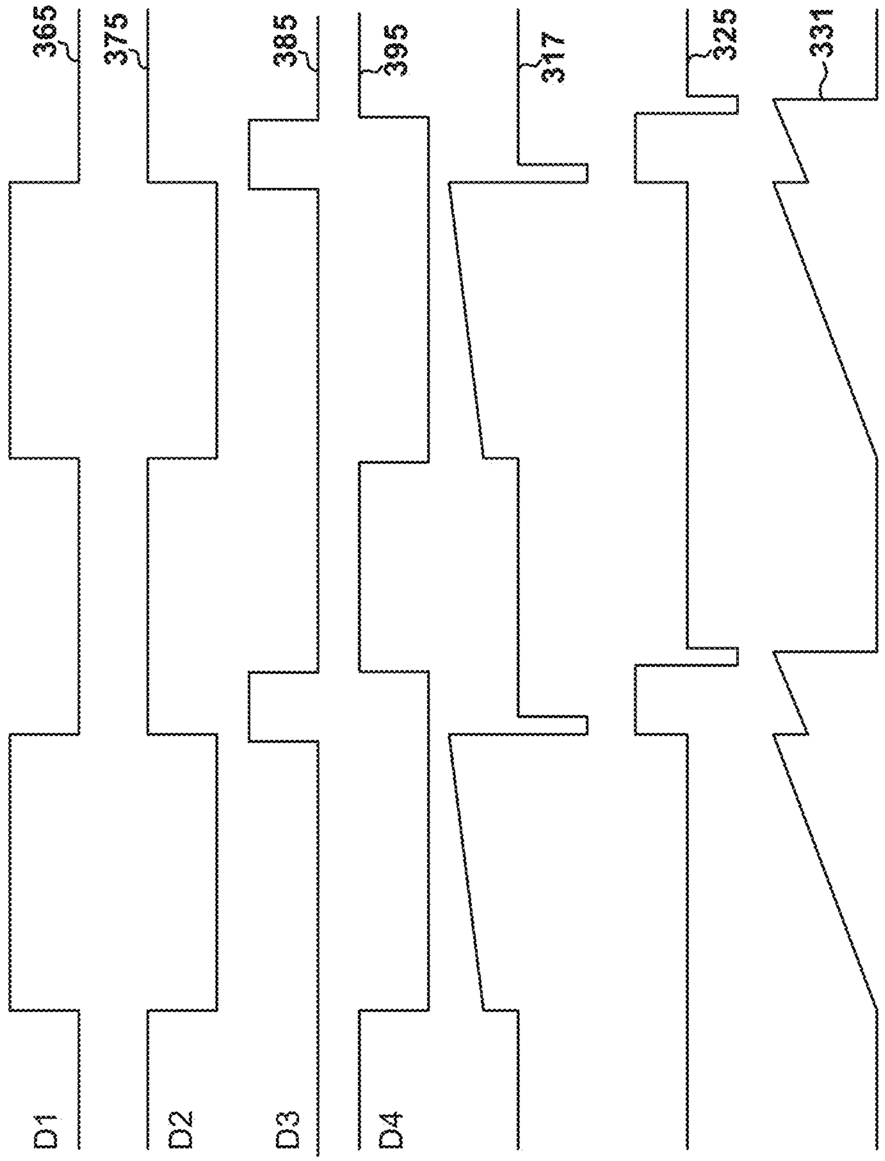
FIG. 3 shows simplified timing diagrams for the power converter as shown in FIG. 1 and/or the power converter as shown in FIG. 2 according to some embodiments of the present invention.

FIG. 3 shows simplified timing diagrams for the power converter 100 as shown in FIG. 1 and/or the power converter 200 as shown in FIG. 2 according to some embodiments of the present invention. These diagrams are merely examples, which should not unduly limit the scope of the claims. One of ordinary skill in the art would recognize many variations, alternatives, and modifications. For example, the waveform 365 represents the drive voltage 165 as a function of time, the waveform 375 represents the drive voltage 175 as a function of time, the waveform 385 represents the drive voltage 185 as a function of time, the waveform 395 represents the drive voltage 195 as a function of time, the waveform 317 represents the current 117 as a function of time, the waveform 325 represents the current 125 as a function of time, and the waveform 331 represents the current 131 as a function of time. As an example, the waveform 365 represents the drive voltage 265 as a function of time, the waveform 375 represents the drive voltage 275 as a function of time, the waveform 385 represents the drive voltage 285 as a function of time, the waveform 395 represents the drive voltage 295 as a function of time, the waveform 317 represents the current 217 as a function of time, the waveform 325 represents the current 225 as a function of time, and the waveform 331 represents the current 231 as a function of time.

As shown in FIG. 1 and FIG. 3, during the process of the bipolar transistor 120 changing from being turned off to being turned on (e.g., when the voltage 133 is smaller than a predetermined threshold), the transistor 160 and the bipolar transistor 110 are turned on, and the transistors 170, 180 and 190 are turned off according to certain embodiments. For example, if the transistor 160 and the bipolar transistor 110 are turned on and the transistors 170, 180 and 190 are turned off, the base 124 of the bipolar transistor 120 receives the current 117 from the emitter 116 of the bipolar transistor 110. As an example, if the transistor 160 and the bipolar transistor 110 are turned on and the transistors 170, 180 and 190 are turned off, the bipolar transistor 120 uses the current 117 as its drive current. In some examples, when the voltage 133 is smaller than a predetermined threshold (e.g., during the process of the bipolar transistor 120 changing from being turned off to being turned on), the transistor 160 and the bipolar transistor 110 are turned on, and the transistors 170, 180 and 190 are turned off.

In some embodiments, after the bipolar transistor 120 becomes turned on, when the bipolar transistor 120 remains turned on but before the voltage 133 reaches the predetermined threshold, the transistor 160 and the bipolar transistor 110 remain turned on, and the transistors 170, 180 and 190 remain turned off. For example, if the transistor 160 and the bipolar transistor 110 remain turned on and the transistors 170, 180 and 190 remain turned off, the base 124 of the bipolar transistor 120 receives the current 117 from the emitter 116 of the bipolar transistor 110. As an example, if the transistor 160 and the bipolar transistor 110 remain turned on and the transistors 170, 180 and 190 remain turned off, the bipolar transistor 120 uses the current 117 as its drive current. In certain examples, when the bipolar transistor 120 remains turned on and the voltage 133 remains smaller than the predetermined threshold, the transistor 160 and the bipolar transistor 110 remain turned on, and the transistors 170, 180 and 190 remain turned off.

In certain embodiments, after the voltage 133 reaches the predetermined threshold, when the bipolar transistor 120 remains turned on, the transistors 160 and 190 and the bipolar transistor 110 are turned off, and the transistors 170 and 180 are turned on. For example, if the transistors 160 and 190 and the bipolar transistor 110 are turned off, and the transistors 170 and 18130 are turned on, the base 124 of the bipolar transistor 120 receives the current 125 from the source 186 of the transistor 180. As an example, if the transistors 160 and 190 and the bipolar transistor 110 are turned off, and the transistors 170 and 180 are turned on, the bipolar transistor 120 uses the current 125 as its drive current. In some examples, after the voltage 133 becomes equal to and/or larger than the predetermined threshold, when the bipolar transistor 120 remains turned on, the transistors 160 and 190 and the bipolar transistor 110 are turned off, and the transistors 170 and 180 are turned on. For example, after the voltage 133 becomes equal to and/or larger than the predetermined threshold (e.g., after the voltage 133 reaches the predetermined threshold), the transistor 160 is turned off and the transistor 170 is turned on, so that the current 115 is reduced to zero in magnitude and the current 117 is also reduced to zero in magnitude.

According to some embodiments, after the transistors 160 and 190 and the bipolar transistor 110 are turned off and the transistors 170 and 180 are turned on, the transistor 180 becomes turned off, the transistor 190 becomes turned on, the transistor 170 remains turned on, the transistor 160 remains turned off, and the bipolar transistor 110 remains turned off. For example, if the transistor 180 becomes turned off, the transistor 190 becomes turned on, the transistor 170 remains turned on, the transistor 160 remains turned off, and the bipolar transistor 110 remains turned off, the bipolar transistor 120 becomes turned off. As an example, when the transistor 170 remains turned on, the transistor 160 remains turned off, and the bipolar transistor 110 remains turned off but before the transistor 180 becomes turned off and the transistor 190 becomes turned on, the bipolar transistor 120 remains turned on and uses the current 125 as its drive current. In certain examples, before the bipolar transistor 120 becomes turned off, the bipolar transistor 120 uses the current 125 as its drive current.

In certain embodiments, if the transistor 160 and the bipolar transistor 110 become turned off, the transistors 170 and 180 become turned on, and the transistor 190 remains turned off, the drive current of the bipolar transistor 120 changes from the current 117 to the current 125. For example, the base 124 of the bipolar transistor 120 receives the drive current (e.g., the current 117 and/or the current 125) for the bipolar transistor 120. In some examples, if the transistor 160 becomes turned off and the transistor 170 becomes turned on, the current 115 becomes zero in magnitude, the bipolar transistor 110 becomes turned off, and the current 117 also becomes zero in magnitude. For example, if the current 117 becomes zero in magnitude, the current 117 becomes unavailable to be used as the drive current of the bipolar transistor 120. In some embodiments, if the transistor 180 becomes turned off and the transistor 190 becomes turned on, the current 125 becomes zero in magnitude and becomes unavailable to be used as the drive current of the bipolar transistor 120.

According to some embodiments, when the bipolar transistor 120 is turned on, the bipolar transistor 120 first uses the current 117 as its drive current and then uses the current 125 as its drive current. In certain examples, during the process of the bipolar transistor 120 changing from being turned off to being turned on, the bipolar transistor 120 uses the current 117 as its drive current. For example, the current 117, which is used as the drive current of the bipolar transistor 120, is sufficiently large so that the bipolar transistor 120 can quickly enter the saturation region in order to reduce the turn-on energy loss of the bipolar transistor 120 and also to increase the turn-on speed of the bipolar transistor 120. As an example, if the current 117 is used as the drive current of the bipolar transistor 120, the drive current of the bipolar transistor 120 is too large, thus reducing the turn-off speed of the bipolar transistor 120 and increasing the turn-off energy loss of the bipolar transistor 120. In certain examples, in order to increase the turn-off speed of the bipolar transistor 120 and decrease the turn-off energy loss of the bipolar transistor 120, before the bipolar transistor 120 becomes turned off, the bipolar transistor 120 reduces its drive current from the current 117 to the current 125, wherein the current 125 is smaller than the current 117 in magnitude. For example, with the reduction of the drive current of the bipolar transistor 120, during the process of the bipolar transistor 120 changing from being turned on to being turned off, the minority charge carriers previously stored in the base region of the bipolar transistor 120 when the bipolar transistor 120 is turned on can recombine rapidly in order to increase the turn-off speed of the bipolar transistor 120 and decrease the turn-off energy loss of the bipolar transistor 120, thus improving the system efficiency and the output power of the power converter 100.

Referring to FIG. 1 and FIG. 3, the current source 150 generates a current 151, and the current source 152 generates the current 153 according to certain embodiments. For example, if the transistor 160 is turned on and the transistor 170 is turned off, the base 114 of the bipolar transistor 110 receives the drive current 115, which is equal to the current 151, and the emitter 116 of the bipolar transistor 110 outputs the current 117. As an example, the current 117 has the following relationship with the current 151:

$$I_{117}=\beta\times I_{151} \quad \text{(Equation 1)}$$

wherein $I_{117}$ represents the current 117, and $I_{151}$ represents the current 151. Additionally, β represents the amplification factor of the bipolar transistor 110. For example, β is larger than 1. As an example, the current 117 is larger than the current 151 in magnitude.

In some examples, during the process of the bipolar transistor 120 changing from being turned off to being turned on, the bipolar transistor 120 uses the current 117 as its drive current. For example, the current 117, which is used as the drive current of the bipolar transistor 120, is sufficiently large so that the bipolar transistor 120 can quickly enter the saturation region in order to reduce the turn-on energy loss of the bipolar transistor 120.

In certain examples, after the bipolar transistor 120 becomes turned on, when the bipolar transistor 120 remains turned on but before the voltage 133 reaches the predetermined threshold, the bipolar transistor 120 also uses the current 117 as its drive current. For example, the current 131 that flows through the resistor 130 has the following relationship with the current 117 as the drive current of the bipolar transistor 120:

$$I_{131}=I_c+\beta\times I_{151} \quad \text{(Equation 2)}$$

wherein $I_{131}$ represents the current 131 that flows through the resistor 130, $I_c$ represents the current that is received by the collector 122 of the bipolar transistor 120, and $I_{151}$ represents the current 151. Additionally, β represents the amplification factor of the bipolar transistor 110. As an example, the predetermined threshold is equal to a predetermined percentage (e.g., 90%) of a maximum voltage (e.g., $V_{csmax}$) that is allowed by the resistor 131.

In some embodiments, after the voltage 133 reaches the predetermined threshold, when the bipolar transistor 120 remains turned on, the bipolar transistor 120 uses the current 125 as its drive current. In certain examples, the current 125 is much smaller than the current 117. For example, the current 125 is equal to the current 115. As an example, the current 115 is much smaller than the current 117. In some examples, with the reduction of the drive current from the current 117 to the current 125, during the process of the bipolar transistor 120 changing from being turned on to being turned off, the minority charge carriers previously stored in the base region of the bipolar transistor 120 when the bipolar transistor 120 is turned on can recombine rapidly in order to reduce the turn-off time of the bipolar transistor 120 and decrease the turn-off energy loss of the bipolar transistor 120.

As shown in FIG. 2 and FIG. 3, during the process of the bipolar transistor 220 changing from being turned off to being turned on, the transistor 260 and the bipolar transistor 210 are turned on, and the transistors 270, 280 and 290 are turned off according to certain embodiments. For example, if the transistor 260 and the bipolar transistor 210 are turned on and the transistors 270, 280 and 290 are turned off, the base 224 of the bipolar transistor 220 receives the current 217 from the emitter 216 of the bipolar transistor 210. As an example, if the transistor 260 and the bipolar transistor 210 are turned on and the transistors 270, 280 and 290 are turned off, the bipolar transistor 220 uses the current 217 as its drive current. In some examples, when the voltage 233 is smaller than a predetermined threshold (e.g., during the process of the bipolar transistor 220 changing from being turned off to being turned on), the transistor 260 and the bipolar transistor 210 are turned on, and the transistors 270, 280 and 290 are turned off.

In some embodiments, after the bipolar transistor 220 becomes turned on, when the bipolar transistor 220 remains turned on but before the voltage 233 reaches a predetermined threshold, the transistor 260 and the bipolar transistor 210 remain turned on, and the transistors 270, 280 and 290 remain turned off. For example, if the transistor 260 and the bipolar transistor 210 remain turned on and the transistors 270, 280 and 290 remain turned off, the base 224 of the bipolar transistor 220 receives the current 217 from the emitter 216 of the bipolar transistor 210. As an example, if the transistor 260 and the bipolar transistor 210 remain turned on and the transistors 270, 280 and 290 remain turned off, the bipolar transistor 220 uses the current 217 as its drive current. In certain examples, when the bipolar transistor 220 remains turned on and the voltage 233 remains smaller than the predetermined threshold, the transistor 260 and the bipolar transistor 210 remain turned on, and the transistors 270, 280 and 290 remain turned off.

In certain embodiments, after the voltage 233 reaches the predetermined threshold, when the bipolar transistor 220 remains turned on, the transistors 260 and 290 and the bipolar transistor 210 are turned off, and the transistors 270 and 280 are turned on. For example, if the transistors 260 and 290 and the bipolar transistor 210 are turned off, and the transistors 270 and 280 are turned on, the base 224 of the bipolar transistor 220 receives the current 225 from the source 286 of the transistor 280. As an example, if the transistors 260 and 290 and the bipolar transistor 210 are turned off, and the transistors 270 and 280 are turned on, the bipolar transistor 220 uses the current 225 as its drive current. In some examples, after the voltage 233 becomes equal to and/or larger than the predetermined threshold, when the bipolar transistor 220 remains turned on, the transistors 260 and 290 and the bipolar transistor 210 are turned off, and the transistors 270 and 280 are turned on. For example, after the voltage 233 becomes equal to and/or larger than the predetermined threshold (e.g., after the voltage 233 reaches the predetermined threshold), the transistor 260 is turned off and the transistor 270 is turned on, so that the current 215 is reduced to zero in magnitude and the current 217 is also reduced to zero in magnitude.

According to some embodiments, after the transistors 260 and 290 and the bipolar transistor 210 are turned off and the transistors 270 and 280 are turned on, the transistor 280 becomes turned off, the transistor 290 becomes turned on, the transistor 270 remains turned on, the transistor 260 remains turned off, and the bipolar transistor 210 remains turned off. For example, if the transistor 280 becomes turned off, the transistor 290 becomes turned on, the transistor 270 remains turned on, the transistor 260 remains turned off, and the bipolar transistor 210 remains turned off, the bipolar transistor 220 becomes turned off. As an example, when the transistor 270 remains turned on, the transistor 260 remains turned off, and the bipolar transistor 210 remains turned off but before the transistor 280 becomes turned off and the transistor 290 becomes turned on, the bipolar transistor 220 remains turned on and uses the current 225 as its drive current. In certain examples, before the bipolar transistor 220 becomes turned off, the bipolar transistor 220 uses the current 225 as its drive current.

In certain embodiments, if the transistor 260 and the bipolar transistor 210 become turned off, the transistors 270 and 280 become turned on, and the transistor 290 remains turned off, the drive current of the bipolar transistor 220 changes from the current 217 to the current 225. For example, the base 224 of the bipolar transistor 220 receives the drive current (e.g., the current 217 and/or the current 225) for the bipolar transistor 220. In some examples, if the transistor 260 becomes turned off and the transistor 270 becomes turned on, the current 215 becomes zero in magnitude, the bipolar transistor 210 becomes turned off, and the current 217 also becomes zero in magnitude. For example, if the current 217 becomes zero in magnitude, the current 217 becomes unavailable to be used as the drive current of the bipolar transistor 220. In some embodiments, if the transistor 280 becomes turned off and the transistor 290 becomes turned on, the current 225 becomes zero in magnitude and becomes unavailable to be used as the drive current of the bipolar transistor 220.

According to some embodiments, when the bipolar transistor 220 is turned on, the bipolar transistor 220 first uses the current 217 as its drive current and then uses the current 225 as its drive current. In certain examples, during the process of the bipolar transistor 220 changing from being turned off to being turned on, the bipolar transistor 220 uses the current 217 as its drive current. For example, the current 217, which is used as the drive current of the bipolar transistor 220, is sufficiently large so that the bipolar transistor 220 can quickly enter the saturation region in order to reduce the turn-on energy loss of the bipolar transistor 220 and also to increase the turn-on speed of the bipolar transistor 220. As an example, if the current 217 is used as the drive current of the bipolar transistor 220, the drive current of the bipolar transistor 220 is too large, thus reducing the turn-off speed of the bipolar transistor 220 and increasing the turn-off energy loss of the bipolar transistor 220. In certain examples, in order to increase the turn-off speed of the bipolar transistor 220 and decrease the turn-off energy loss of the bipolar transistor 220, before the bipolar transistor 220 becomes turned off, the bipolar transistor 220 reduces its drive current from the current 217 to the current 225, wherein the current 225 is smaller than the current 217 in magnitude. For example, with the reduction of the drive current of the bipolar transistor 220, during the process of the bipolar transistor 220 changing from being turned on to being turned off, the minority charge carriers previously stored in the base region of the bipolar transistor 220 when the bipolar transistor 220 is turned on can recombine rapidly in order to increase the turn-off speed of the bipolar transistor 220 and decrease the turn-off energy loss of the bipolar transistor 220, thus improving the system efficiency and the output power of the power converter 200.

Referring to FIG. 2 and FIG. 3, the current source 250 generates a current 251, and the current source 252 generates the current 253 according to certain embodiments. For example, if the transistor 260 is turned on and the transistor 270 is turned off, the base 214 of the bipolar transistor 210 receives the drive current 215, which is equal to the current 251, and the emitter 216 of the bipolar transistor 210 outputs the current 217. As an example, the current 217 has the following relationship with the current 251:

$$I_{217}=\beta\times I_{251} \quad \text{(Equation 3)}$$

wherein $I_{217}$ represents the current 217, and $I_{251}$ represents the current 251. Additionally, β represents the amplification factor of the bipolar transistor 210. For example, β is larger than 1. As an example, the current 217 is larger than the current 251 in magnitude.

In some examples, during the process of the bipolar transistor 220 changing from being turned off to being turned on, the bipolar transistor 220 uses the current 217 as its drive current. For example, the current 217, which is used as the drive current of the bipolar transistor 220, is sufficiently large so that the bipolar transistor 220 can quickly enter the saturation region in order to reduce the turn-on energy loss of the bipolar transistor 220.

In certain examples, after the bipolar transistor 220 becomes turned on, when the bipolar transistor 220 remains turned on but before the voltage 233 reaches the predetermined threshold, the bipolar transistor 220 also uses the current 217 as its drive current. For example, the current 231 that flows through the resistor 230 has the following relationship with the current 217 as the drive current of the bipolar transistor 220:

$$I_{231}=I_c+\beta\times I_{251} \quad \text{(Equation 4)}$$

wherein $I_{231}$ represents the current 231 that flows through the resistor 230, $I_c$ represents the current that is received by the collector 222 of the bipolar transistor 220, and $I_{251}$ represents the current 251. Additionally, β represents the amplification factor of the bipolar transistor 210. As an example, the predetermined threshold is equal to a predetermined percentage (e.g., 90%) of a maximum voltage (e.g., $V_{csmax}$) that is allowed by the resistor 231.

In some embodiments, after the voltage 233 reaches the predetermined threshold, when the bipolar transistor 220 remains turned on, the bipolar transistor 220 uses the current 225 as its drive current. In certain examples, the current 225 is much smaller than the current 217. For example, the current 225 is equal to the current 215. As an example, the current 215 is much smaller than the current 217. In some examples, with the reduction of the drive current from the current 217 to the current 225, during the process of the bipolar transistor 220 changing from being turned on to being turned off, the minority charge carriers previously stored in the base region of the bipolar transistor 220 when the bipolar transistor 220 is turned on can recombine rapidly in order to reduce the turn-off time of the bipolar transistor 220 and decrease the turn-off energy loss of the bipolar transistor 220.

Figure 4:
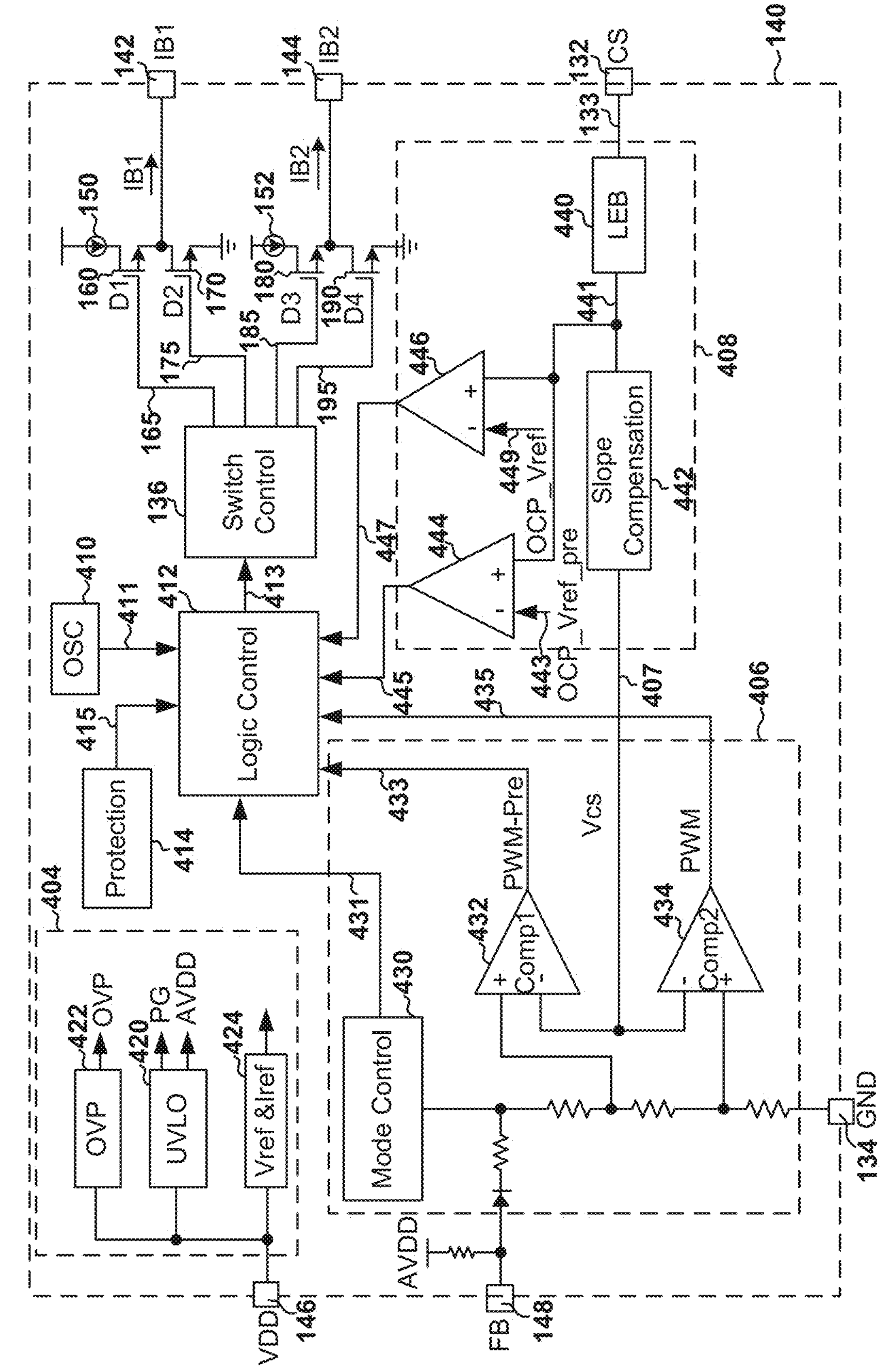
FIG. 4 is a simplified diagram showing certain components of the controller chip for the power converter as shown in FIG. 1 according to certain embodiments of the present invention.

FIG. 4 is a simplified diagram showing certain components of the controller chip 140 for the power converter 100 as shown in FIG. 1 according to certain embodiments of the present invention. This diagram is merely an example, which should not unduly limit the scope of the claims. One of ordinary skill in the art would recognize many variations, alternatives, and modifications. The controller chip 140 (e.g., a controller) includes the terminals 132, 134, 142, 144, 146, and 148 (e.g., pins). Additionally, the controller chip 140 (e.g., a controller) includes the current sources 150 and 152, the transistors 160, 170, 180 and 190, and the switch control circuit 136. Moreover, the controller chip 140 (e.g., a controller) includes a power supply circuit 404, a feedback control circuit 406, a current sensing control circuit 408, an oscillator circuit 410, a logic control circuit 412, and a protection circuit 414. Although the above has been shown using a selected group of components for the controller chip, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the power supply circuit 404 includes an undervoltage-lockout (UVLO) component 420, an overvoltage protection (OVP) component 422, and a reference voltage and/or reference current generator 424. In certain examples, the power supply circuit 404 receives a voltage from the terminal 146. For example, if the voltage received from the terminal 146 exceeds a threshold voltage of the undervoltage-lockout (UVLO) component 420, one or more internal circuits of the controller chip 140 starts normal operation. As an example, if the voltage received from the terminal 146 exceeds a threshold voltage of the overvoltage protection (OVP) component 422, one or more internal circuits of the controller chip 140 starts automatic recovery protection to avoid damage to the controller chip 140. In some examples, the reference voltage and/or reference current generator 424 provides to one or more internal circuits of the controller chip 140 an operation voltage, a reference voltage, and/or a reference current.

In certain embodiments, the feedback control circuit 406 includes a mode control component 430, a comparator 432, and a comparator 434. In some examples, the feedback control circuit 406 receives a voltage from the terminal 148. For example, the comparator 432 receives a voltage 407 and a voltage that is related to the voltage received from the terminal 148 and generates a comparison signal 433. As an example, the comparator 434 receives the voltage 407 and another voltage that is related to the voltage received from the terminal 148 and generates a comparison signal 435. In certain examples, the mode control component 430 determines whether the power converter 100 should operate in a continuous conduction mode (CCM), a quasi-resonant (QR) mode, a frequency reduction mode, and/or a burst mode. For example, the mode control component 430 receives a voltage that is related to the voltage received from the terminal 148 and generates a mode signal 431. As an example, the mode signal 431 indicates the continuous conduction mode (CCM), the quasi-resonant (QR) mode, the frequency reduction mode, and/or the burst mode.

In some embodiments, the current sensing control circuit 408 includes a leading edge blanking (LEB) component 440, a slope compensation component 442, comparators 444 and 446. In certain examples, the leading edge blanking (LEB) component 440 receives the voltage 133 from the terminal 132 and generates a voltage 441. For example, the voltage 441 is received by the comparator 444, which also receives a threshold voltage 443 and generates a comparison signal 445. As an example, the voltage 441 is also received by the comparator 446, which also receives a threshold voltage 449 and generates a comparison signal 447. In some examples, the voltage 441 is received by the slope compensation component 442, which outputs the voltage 407. For example, if the voltage 133 indicates that the power converter 100 operates in a deep continuous conduction mode (DCCM), the slope compensation component 442 performs slope compensation on the voltage 441 to generate the voltage 407. As an example, if the voltage 133 indicates that the power converter 100 does not operate in the deep continuous conduction mode (DCCM), the slope compensation component 442 does not perform slope compensation on the voltage 441, and the voltage 441 is the same as the voltage 407.

In certain embodiments, the oscillator circuit 410 generates a signal 411. For example, the signal 411 is a sawtooth signal with a constant frequency (e.g., a predetermined high frequency). In some embodiments, the protection circuit 414 generates a signal 415 if one or more abnormal signals are detected. For example, the signal 415 is used to make the controller chip 140 enter the state of automatic recovery protection to avoid damage to the controller chip 140.

According to some embodiments, the logic control circuit 412 receives the mode signal 431, the comparison signal 433, the comparison signal 435, the comparison signal 445, the comparison signal 447, the signal 411, and/or the signal 415. For example, the logic control circuit 412 generates a signal 413. As an example, the signal 413 is a square-wave signal with adjustable duty cycle. According to certain embodiments, the switch control circuit 136 receives the signal 413 and generates the drive voltage 165, the drive voltage 175, the drive voltage 185, and the drive voltage 195. For example, the drive voltage 165 is used to turn on and/or turn off the transistor 160. As an example, the drive voltage 175 is used to turn on and/or turn off the transistor 170. For example, the drive voltage 185 is used to turn on and/or turn off the transistor 180. As an example, the drive voltage 195 is used to turn on and/or turn off the transistor 190.

Figure 5:
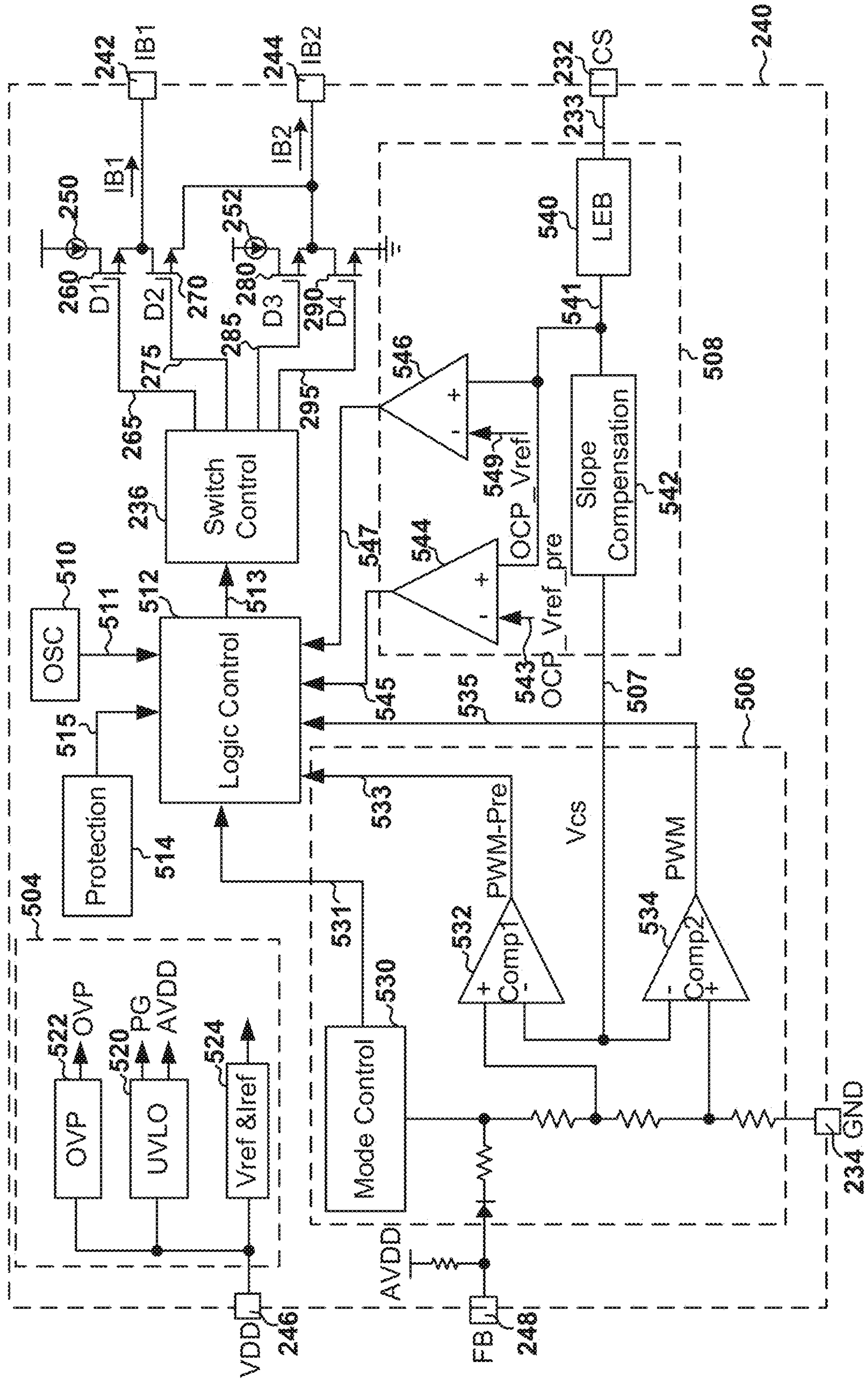
FIG. 5 is a simplified diagram showing certain components of the controller chip for the power converter as shown in FIG. 2 according to certain embodiments of the present invention.

FIG. 5 is a simplified diagram showing certain components of the controller chip 240 for the power converter 200 as shown in FIG. 2 according to certain embodiments of the present invention. This diagram is merely an example, which should not unduly limit the scope of the claims. One of ordinary skill in the art would recognize many variations, alternatives, and modifications. The controller chip 240 (e.g., a controller) includes the terminals 232, 234, 242, 244, 246, and 248 (e.g., pins). Additionally, the controller chip 240 (e.g., a controller) includes the current sources 250 and 252, the transistors 260, 270, 280 and 290, and the switch control circuit 236. Moreover, the controller chip 240 (e.g., a controller) includes a power supply circuit 504, a feedback control circuit 506, a current sensing control circuit 508, an oscillator circuit 510, a logic control circuit 512, and a protection circuit 514. Although the above has been shown using a selected group of components for the controller chip, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the power supply circuit 504 includes an undervoltage-lockout (UVLO) component 520, an overvoltage protection (OVP) component 522, and a reference voltage and/or reference current generator 524. In certain examples, the power supply circuit 504 receives a voltage from the terminal 246. For example, if the voltage received from the terminal 246 exceeds a threshold voltage of the undervoltage-lockout (UVLO) component 520, one or more internal circuits of the controller chip 240 starts normal operation. As an example, if the voltage received from the terminal 246 exceeds a threshold voltage of the overvoltage protection (OVP) component 522, one or more internal circuits of the controller chip 240 starts automatic recovery protection to avoid damage to the controller chip 240. In some examples, the reference voltage and/or reference current generator 524 provides to one or more internal circuits of the controller chip 240 an operation voltage, a reference voltage, and/or a reference current.

In certain embodiments, the feedback control circuit 506 includes a mode control component 530, a comparator 532, and a comparator 534. In some examples, the feedback control circuit 506 receives a voltage from the terminal 248. For example, the comparator 532 receives a voltage 507 and a voltage that is related to the voltage received from the terminal 248 and generates a comparison signal 533. As an example, the comparator 534 receives the voltage 507 and another voltage that is related to the voltage received from the terminal 248 and generates a comparison signal 535. In certain examples, the mode control component 530 determines whether the power converter 200 should operate in a continuous conduction mode (CCM), a quasi-resonant (QR) mode, a frequency reduction mode, and/or a burst mode. For example, the mode control component 530 receives a voltage that is related to the voltage received from the terminal 248 and generates a mode signal 531. As an example, the mode signal 531 indicates the continuous conduction mode (CCM), the quasi-resonant (QR) mode, the frequency reduction mode, and/or the burst mode.

In some embodiments, the current sensing control circuit 508 includes a leading edge blanking (LEB) component 540, a slope compensation component 542, comparators 544 and 546. In certain examples, the leading edge blanking (LEB) component 540 receives the voltage 233 from the terminal 232 and generates a voltage 541. For example, the voltage 541 is received by the comparator 544, which also receives a threshold voltage 543 and generates a comparison signal 545. As an example, the voltage 541 is also received by the comparator 546, which also receives a threshold voltage 549 and generates a comparison signal 547. In some examples, the voltage 541 is received by the slope compensation component 542, which outputs the voltage 507. For example, if the voltage 233 indicates that the power converter 200 operates in a deep continuous conduction mode (DCCM), the slope compensation component 542 performs slope compensation on the voltage 541 to generate the voltage 507. As an example, if the voltage 233 indicates that the power converter 200 does not operate in the deep continuous conduction mode (DCCM), the slope compensation component 542 does not perform slope compensation on the voltage 541, and the voltage 541 is the same as the voltage 507.

In certain embodiments, the oscillator circuit 510 generates a signal 511. For example, the signal 511 is a sawtooth signal with a constant frequency (e.g., a predetermined high frequency). In some embodiments, the protection circuit 514 generates a signal 515 if one or more abnormal signals are detected. For example, the signal 515 is used to make the controller chip 240 enter the state of automatic recovery protection to avoid damage to the controller chip 240.

According to some embodiments, the logic control circuit 512 receives the mode signal 531, the comparison signal 533, the comparison signal 535, the comparison signal 545, the comparison signal 547, the signal 511, and/or the signal 515. For example, the logic control circuit 512 generates a signal 513. As an example, the signal 413 is a square-wave signal with adjustable duty cycle. According to certain embodiments, the switch control circuit 236 receives the signal 513 and generates the drive voltage 265, the drive voltage 275, the drive voltage 285, and the drive voltage 295. For example, the drive voltage 265 is used to turn on and/or turn off the transistor 260. As an example, the drive voltage 275 is used to turn on and/or turn off the transistor 270. For example, the drive voltage 285 is used to turn on and/or turn off the transistor 280. As an example, the drive voltage 295 is used to turn on and/or turn off the transistor 290.

In some embodiments, the bipolar transistor 110 and the bipolar transistor 120 are two separate transistors in two different chip packages. For example, the bipolar transistor 110 and the bipolar transistor 120 are placed together in a single chip package. As an example, the bipolar transistor 110, the bipolar transistor 120, and the controller chip 140 are placed together in a single chip package. In certain embodiments, the bipolar transistor 210 and the bipolar transistor 220 are two separate transistors in two different chip packages. For example, the bipolar transistor 210 and the bipolar transistor 220 are placed together in a single chip package. As an example, the bipolar transistor 210, the bipolar transistor 220, and the controller chip 240 are placed together in a single chip package.

Figure 6:
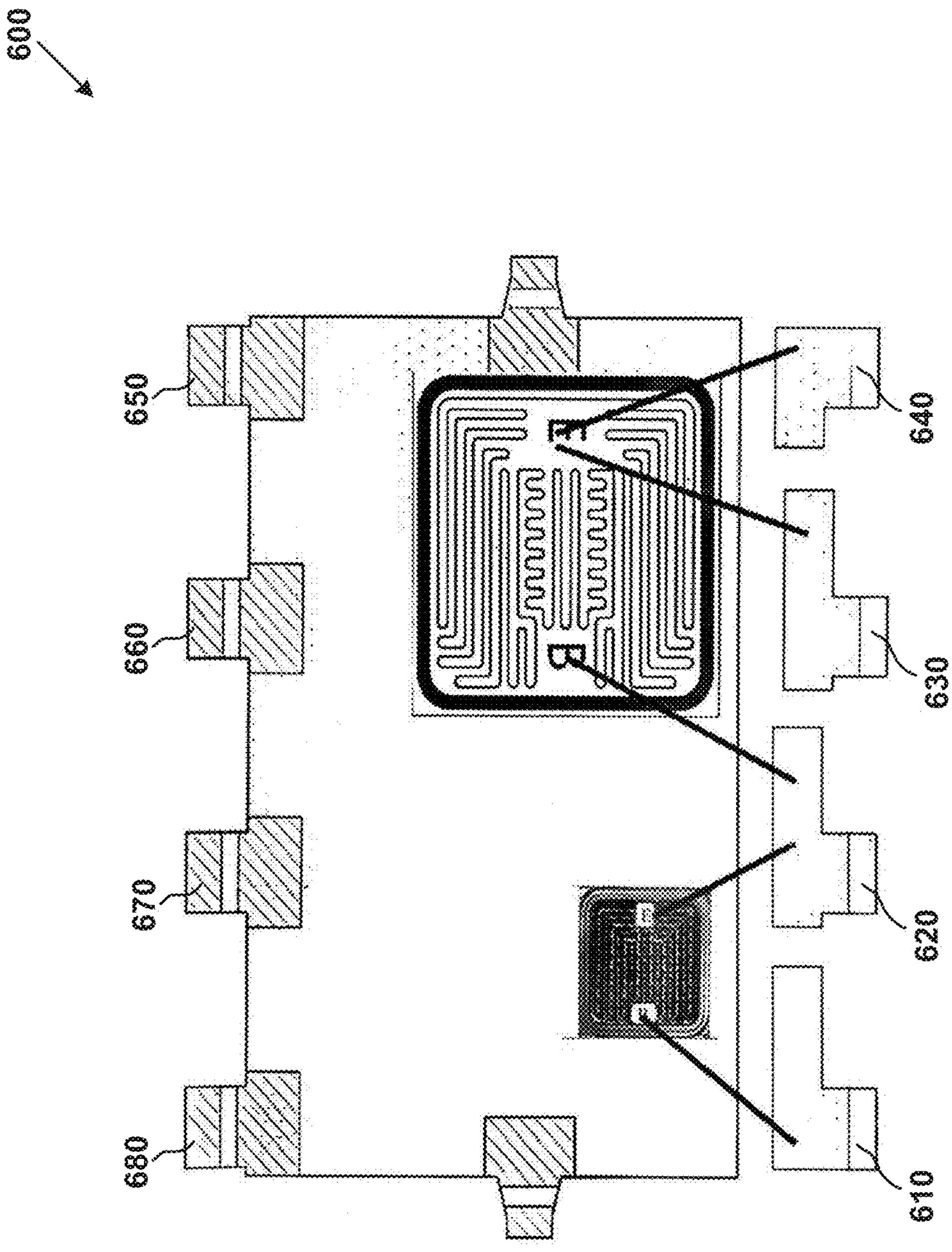
FIG. 6 is a simplified diagram showing a chip package for the bipolar transistors of the power converter as shown in FIG. 1 and/or for the bipolar transistors of the power converter as shown in FIG. 2 according to certain embodiments of the present invention.

FIG. 6 is a simplified diagram showing a chip package for the bipolar transistors 110 and 120 of the power converter 100 as shown in FIG. 1 and/or for the bipolar transistors 210 and 220 of the power converter 200 as shown in FIG. 2 according to certain embodiments of the present invention. This diagram is merely an example, which should not unduly limit the scope of the claims. One of ordinary skill in the art would recognize many variations, alternatives, and modifications. The chip package 600 includes terminals (e.g., pins) 610, 620, 630, 640, 650, 660, 670, and 680.

In some embodiments, the bipolar transistors 110 and 120 of the power converter 100 are included in the chip package 600. For example, the chip package 600 is a single-base chip package. As an example, in the chip package 600, the collector 112 of the bipolar transistor 110 and the collector 122 of the bipolar transistor 120 are connected to each other. In certain examples, pin 610 is connected to the base 114 of the bipolar transistor 110 and used to receive the drive current 115 for the bipolar transistor 110. In some examples, pin 620 is connected to the emitter 116 of the bipolar transistor 110 and the base 124 of the bipolar transistor 120 and is used to receive a drive current (e.g., the current 117 and/or the current 125) for the bipolar transistor 120. In certain examples, pins 630 and 640 both are connected to the emitter 126 of the bipolar transistor 120. For example, in order to increase the heat dissipation area and reduce the temperature, a chip package (e.g., the chip package 600) with multiple wire-bonding connections and/or multiple pins is used. As an example, two pins are connected through two wire-bonding connections respectively, and each wire-bonding connection includes multiple wires, the number of which is determined according to the area of the emitter 126 of the bipolar transistor 120. In some examples, pins 650, 660, 670 and 680 are connected to the collector 112 of the bipolar transistor 110 and the collector 122 of the bipolar transistor 120. As an example, for heat dissipation and also layout convenience of a printed circuit board, a multi-pin chip package (e.g., the chip package 600) is used. For example, the collector area of the bipolar transistors 110 and 120 is located at the back of the bipolar transistors 110 and 120, so the bipolar transistors 110 and 120 are connected to each other using conductive adhesive without wire bonding to reduce impedance.

In certain embodiments, the bipolar transistors 210 and 220 of the power converter 200 are included in the chip package 600. For example, the chip package 600 is a single-base chip package. As an example, in the chip package 600, the collector 212 of the bipolar transistor 210 and the collector 222 of the bipolar transistor 220 are connected to each other. In certain examples, pin 610 is connected to the base 214 of the bipolar transistor 210 and used to receive the drive current 215 for the bipolar transistor 210. In some examples, pin 620 is connected to the emitter 216 of the bipolar transistor 210 and the base 224 of the bipolar transistor 220 and used to receive a drive current (e.g., the current 217 and/or the current 225) for the bipolar transistor 220. In certain examples, pins 630 and 640 both are connected to the emitter 226 of the bipolar transistor 220. For example, in order to increase the heat dissipation area and reduce the temperature, a chip package (e.g., the chip package 600) with multiple wire-bonding connections and/or multiple pins is used. As an example, two pins are connected through two wire-bonding connections respectively, and each wire-bonding connection includes multiple wires, the number of which is determined according to the area of the emitter 226 of the bipolar transistor 220. In some examples, pins 650, 660, 670 and 680 are connected to the collector 212 of the bipolar transistor 210 and the collector 222 of the bipolar transistor 220. As an example, for heat dissipation and also layout convenience of a printed circuit board, a multi-pin chip package (e.g., the chip package 600) is used. For example, the collector area of the bipolar transistors 210 and 220 is located at the back of the bipolar transistors 210 and 220, so the bipolar transistors 210 and 220 are connected to each other using conductive adhesive without wire bonding to reduce impedance.

Figure 7:
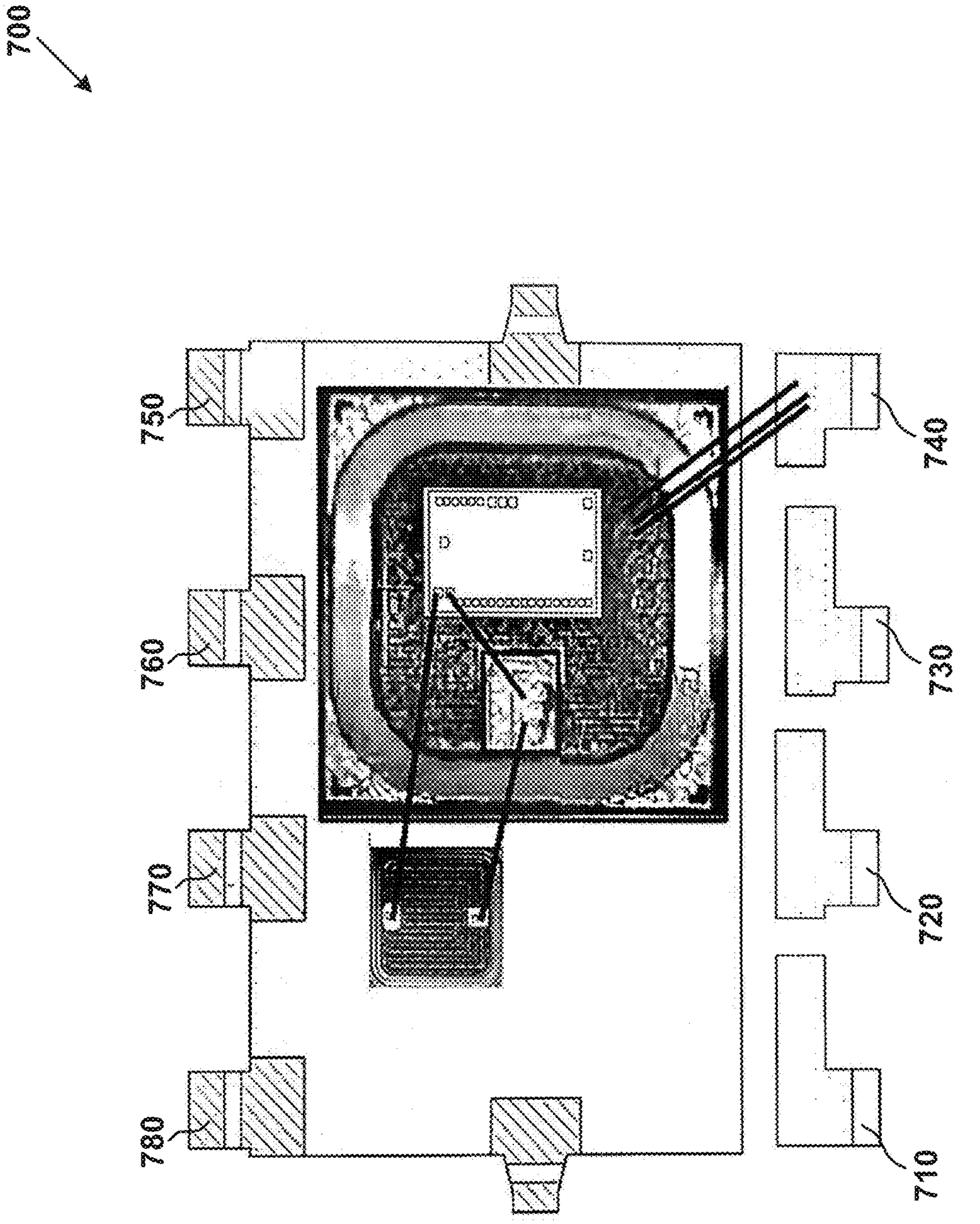
FIG. 7 is a simplified diagram showing a chip package for the bipolar transistors and the controller chip of the power converter as shown in FIG. 1 and/or for the bipolar transistors and the controller chip of the power converter as shown in FIG. 2 according to certain embodiments of the present invention.

FIG. 7 is a simplified diagram showing a chip package for the bipolar transistors 110 and 120 and the controller chip 140 of the power converter 100 as shown in FIG. 1 and/or for the bipolar transistors 210 and 220 and the controller chip 240 of the power converter 200 as shown in FIG. 2 according to certain embodiments of the present invention. This diagram is merely an example, which should not unduly limit the scope of the claims. One of ordinary skill in the art would recognize many variations, alternatives, and modifications. The chip package 700 includes terminals (e.g., pins) 710, 720, 730, 740, 750, 760, 770, and 780.

In some embodiments, the bipolar transistor 110 and the bipolar transistor 120 are packaged at the same level, and the controller chip 140 is packaged on top of the bipolar transistor 120. For example, this package arrangement for the bipolar transistors 110 and 120 and the controller chip 140 can be adjusted. In certain examples, pins 710, 720 and 730 are used connected to the controller chip 140. In some examples, pin 740 is connected to the emitter 126 of the bipolar transistor 120. As an example, in order to increase the heat dissipation area and reduce the temperature, a chip package (e.g., the chip package 700) with multiple wire-bonding connections is used to reduce the impedance of wire bonding. In certain examples, pins 750, 760, 770 and 780 are connected to the collector 112 of the bipolar transistor 110 and the collector 122 of the bipolar transistor 120. As an example, for heat dissipation and also layout convenience of a printed circuit board, a multi-pin package (e.g., the chip package 700) is used. For example, the collector area of the bipolar transistors 110 and 120 is located at the back of the bipolar transistors 110 and 120, so the bipolar transistors 110 and 120 are connected to each other using conductive adhesive without wire bonding to reduce impedance. In some examples, the chip package 700 can add extra pins without increasing the system pin costs and can also provide a simple circuit with few peripheral devices.

In certain embodiments, the bipolar transistor 210 and the bipolar transistor 220 are packaged at the same level, and the controller chip 240 is packaged on top of the bipolar transistor 220. For example, this package arrangement for the bipolar transistors 210 and 220 and the controller chip 240 can be adjusted. In certain examples, pins 710, 720 and 730 are used connected to the controller chip 240. In some examples, pin 740 is connected to the emitter 226 of the bipolar transistor 220. As an example, in order to increase the heat dissipation area and reduce the temperature, a chip package (e.g., the chip package 700) with multiple wire-bonding connections is used to reduce the impedance of wire bonding. In certain examples, pins 750, 760, 770 and 780 are connected to the collector 212 of the bipolar transistor 210 and the collector 222 of the bipolar transistor 220. As an example, for heat dissipation and also layout convenience of a printed circuit board, a multi-pin package (e.g., the chip package 700) is used. For example, the collector area of the bipolar transistors 210 and 220 is located at the back of the bipolar transistors 210 and 220, so the bipolar transistors 210 and 220 are connected to each other using conductive adhesive without wire bonding to reduce impedance. In some examples, the chip package 700 can add extra pins without increasing the system pin costs and can also provide a simple circuit with few peripheral devices.

Some embodiments of the present invention provide a power converter that uses four transistors to drive one or more bipolar transistors. For example, the power converter can reduce the switching loss of one or more bipolar transistors and/or increase the turn-on speed and/or the turn-off speed of one or more bipolar transistors. As an example, the power converter can achieve efficient and/or fast switching in a power range that is significantly higher than 10 watts.

According to certain embodiments, a controller for a power converter includes: a first controller terminal connected to a first base of a first bipolar transistor, the first bipolar transistor further including a first collector and a first emitter; a second controller terminal connected to the first emitter of the first bipolar transistor and a second base of a second bipolar transistor, the second bipolar transistor further including a second collector and a second emitter, the second collector being connected to the first collector; a third controller terminal connected to the second emitter of the second bipolar transistor and a resistor, the resistor being configured to generate a sensing voltage received by the third controller terminal; wherein: if the sensing voltage is smaller than a predetermined threshold, the first controller terminal is configured to output a first current to the first base to generate a second current at the first emitter, the second current flowing to the second base to turn on the second bipolar transistor; and if the sensing voltage reaches the predetermined threshold, the second controller terminal is configured to output a third current to the second base before the second bipolar transistor becomes turned off; wherein the third current is smaller than the second current in magnitude. For example, the controller is implemented according to at least FIG. 1 and/or FIG. 2.

As an example, the first current is equal to the third current in magnitude; and the first current is smaller than the second current in magnitude. For example, if the sensing voltage reaches the predetermined threshold, the first controller terminal is configured to reduce the first current to zero to turn off the first bipolar transistor and also reduce the second current to zero.

According to some embodiments, a controller for a power converter includes: a first current source configured to generate a first current; a first transistor including a first transistor terminal, a second transistor terminal, and a third transistor terminal, the first transistor terminal being connected to the first current source; a second transistor including a fourth transistor terminal, a fifth transistor terminal, and a sixth transistor terminal, the fourth transistor terminal being connected to the third transistor terminal; a second current source configured to generate a second current; a third transistor including a seventh transistor terminal, an eighth transistor terminal, and a ninth transistor terminal, the seventh transistor terminal being connected to the second current source; a fourth transistor including a tenth transistor terminal, an eleventh transistor terminal, and a twelfth transistor terminal, the tenth transistor terminal being connected to the ninth transistor terminal; and a drive voltage generator configured to: output a first drive voltage to the second transistor terminal of the first transistor; output a second drive voltage to the fifth transistor terminal of the second transistor; output a third drive voltage to the eighth transistor terminal of the third transistor; and output a fourth drive voltage to the eleventh transistor terminal of the fourth transistor. For example, the controller is implemented according to at least FIG. 1 and/or FIG. 2.

As an example, the sixth transistor terminal of the second transistor is biased to a ground voltage. For example, the sixth transistor terminal of the second transistor is connected to the ninth transistor terminal and the tenth transistor terminal. As an example, the drive voltage generator is further configured to, output the first drive voltage to turn on the first transistor; output the second drive voltage to turn off the second transistor; output the third drive voltage to turn off the third transistor; and output the fourth drive voltage to turn off the fourth transistor. For example, the drive voltage generator is further configured to, output the first drive voltage to turn off the first transistor; output the second drive voltage to turn on the second transistor; output the third drive voltage to turn on the third transistor; and output the fourth drive voltage to turn off the fourth transistor.

As an example, the third transistor terminal and the fourth transistor terminal are both connected to a first base of a first bipolar transistor, the first bipolar transistor further including a first collector and a first emitter. For example, the ninth transistor terminal and the tenth transistor terminal are both connected to the first emitter of the first bipolar transistor and a second base of a second bipolar transistor, the second bipolar transistor further including a second collector and a second emitter, the second collector being connected to the first collector, the second emitter being connected to a resistor configured to generate a sensing voltage received by the controller. As an example, the drive voltage generator is further configured to, if the sensing voltage is smaller than a predetermined threshold: output the first drive voltage to turn on the first transistor; output the second drive voltage to turn off the second transistor; output the third drive voltage to turn off the third transistor; and output the fourth drive voltage to turn off the fourth transistor. For example, the drive voltage generator is further configured to, if the sensing voltage reaches the predetermined threshold: output the first drive voltage to turn off the first transistor; output the second drive voltage to turn on the second transistor; output the third drive voltage to turn on the third transistor; and output the fourth drive voltage to turn off the fourth transistor. As an example, each transistor of the first transistor, the second transistor, the third transistor, and the fourth transistor is a MOSFET.

According to certain embodiments, a method for a power converter includes: receiving a sensing voltage from a resistor; if the sensing voltage is smaller than a predetermined threshold, outputting a first current to a first base of a first bipolar transistor to generate a second current at a first emitter of the first bipolar transistor, the first emitter of the first bipolar transistor being connected to a second base of a second bipolar transistor, the second current flowing to the second base to turn on the second bipolar transistor, the first bipolar transistor further including a first collector, the second bipolar transistor further including a second collector and a second emitter, the second collector being connected to the first collector, the second emitter being connected to the resistor; and if the sensing voltage reaches the predetermined threshold, outputting a third current to the second base of the second bipolar transistor before the second bipolar transistor becomes turned off; wherein the third current is smaller than the second current in magnitude. For example, the method is implemented according to at least FIG. 1 and/or FIG. 2.

As an example, the first current is equal to the third current in magnitude; and the first current is smaller than the second current in magnitude. For example, the method further includes, if the sensing voltage reaches the predetermined threshold: reducing the first current to zero to turn off the first bipolar transistor; and reducing the second current to zero.

According to some embodiments, a method for a power converter includes: outputting a first drive voltage to a first transistor including a first transistor terminal, a second transistor terminal, and a third transistor terminal, the first transistor terminal being connected to a first current source configured to generate a first current, the second transistor terminal being configured to receive the first drive voltage; outputting a second drive voltage to a second transistor, the second transistor including a fourth transistor terminal, a fifth transistor terminal, and a sixth transistor terminal, the fourth transistor terminal being connected to the third transistor terminal, the fifth transistor terminal configured to receive the second drive voltage; outputting a third drive voltage to a third transistor, the third transistor including a seventh transistor terminal, an eighth transistor terminal, and a ninth transistor terminal, the seventh transistor terminal being connected to a second current source configured to generate a second current, the eighth transistor terminal being configured to receive the third drive voltage; and outputting a fourth drive voltage to a fourth transistor, the fourth transistor including a tenth transistor terminal, an eleventh transistor terminal, and a twelfth transistor terminal, the tenth transistor terminal being connected to the ninth transistor terminal, the eleventh transistor terminal being configured to receive the fourth drive voltage. For example, the method is implemented according to at least FIG. 1 and/or FIG. 2.

As an example, the method further includes: receiving a sensing voltage from a resistor connected to a second emitter of a second bipolar transistor, the second bipolar transistor further including a second base and a second collector, the second collector being connected to a first collector of a first bipolar transistor, the first bipolar transistor further including a first base and a first emitter, the first emitter being connected to the second base. For example, the method further includes, if the sensing voltage is smaller than a predetermined threshold: outputting the first drive voltage to turn on the first transistor; outputting the second drive voltage to turn off the second transistor; outputting the third drive voltage to turn off the third transistor; and outputting the fourth drive voltage to turn off the fourth transistor. As an example, the method further includes, if the sensing voltage reaches the predetermined threshold: outputting the first drive voltage to turn off the first transistor; outputting the second drive voltage to turn on the second transistor;

outputting the third drive voltage to turn on the third transistor; and outputting the fourth drive voltage to turn off the fourth transistor.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller for a power converter, the controller comprising:

a first controller terminal connected to a first base of a first bipolar transistor, the first bipolar transistor further including a first collector and a first emitter;

a second controller terminal connected to the first emitter of the first bipolar transistor and a second base of a second bipolar transistor, the second bipolar transistor further including a second collector and a second emitter, the second collector being connected to the first collector; and a third controller terminal connected to the second emitter of the second bipolar transistor and a resistor, the resistor being configured to generate a sensing voltage received by the third controller terminal;

wherein:

if the sensing voltage is smaller than a predetermined threshold, the first controller terminal is configured to output a first current to the first base to generate a second current at the first emitter, the second current flowing to the second base to turn on the second bipolar transistor; and if the sensing voltage reaches the predetermined threshold, the second controller terminal is configured to output a third current to the second base before the second bipolar transistor becomes turned off;

wherein the third current is smaller than the second current in magnitude.

2. The controller of claim 1 wherein:

the first current is equal to the third current in magnitude; and the first current is smaller than the second current in magnitude.

3. The controller of claim 1 wherein, if the sensing voltage reaches the predetermined threshold, the first controller terminal is configured to reduce the first current to zero to turn off the first bipolar transistor and also reduce the second current to zero.

4. A method for a power converter, the method comprising:

receiving a sensing voltage from a resistor;

if the sensing voltage is smaller than a predetermined threshold, outputting a first current to a first base of a first bipolar transistor to generate a second current at a first emitter of the first bipolar transistor, the first emitter of the first bipolar transistor being connected to a second base of a second bipolar transistor, the second current flowing to the second base to turn on the second bipolar transistor, the first bipolar transistor further including a first collector, the second bipolar transistor further including a second collector and a second emitter, the second collector being connected to the first collector, the second emitter being connected to the resistor; and if the sensing voltage reaches the predetermined threshold, outputting a third current to the second base of the second bipolar transistor before the second bipolar transistor becomes turned off;

wherein the third current is smaller than the second current in magnitude.

5. The method of claim 4 wherein:

the first current is equal to the third current in magnitude; and the first current is smaller than the second current in magnitude.

6. The method of claim 4, and further comprising, if the sensing voltage reaches the predetermined threshold:

reducing the first current to zero to turn off the first bipolar transistor; and reducing the second current to zero.

* * * * *